(12) United States Patent
Lin et al.

(10) Patent No.: US 7,869,499 B2
(45) Date of Patent: Jan. 11, 2011

(54) VARIABLE-FREQUENCY CIRCUIT WITH A COMPENSATION MECHANISM

(75) Inventors: Kuo-Fan Lin, Taoyuan Hsien (TW); Chien-Li Tsai, Taoyuan Hsien (TW)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 836 days.

(21) Appl. No.: 11/878,886

(22) Filed: Jul. 27, 2007

(65) Prior Publication Data
US 2009/0028273 A1    Jan. 29, 2009

(51) Int. Cl.
*H03K 7/08* (2006.01)
(52) U.S. Cl. ..................................... 375/238
(58) Field of Classification Search ................. 375/130, 375/238, 259, 260, 295, 324, 327, 329, 343, 375/344, 356, 373, 376; 327/103, 105, 113, 327/115, 142, 148, 156, 157, 172, 175; 331/2, 331/11, 14, 16, 17, 23, 34, 37, 143, 179
See application file for complete search history.

(56) References Cited

U.S. PATENT DOCUMENTS

| | | | |
|---|---|---|---|
| 4,376,268 A * | 3/1983 | Moriya et al. ................. | 331/10 |
| 5,180,964 A * | 1/1993 | Ewing ......................... | 323/222 |
| 5,334,952 A * | 8/1994 | Maddy et al. ................ | 331/1 A |
| 6,212,079 B1 | 4/2001 | Balakrishnan et al. | |
| 6,288,583 B1 * | 9/2001 | Ozawa et al. ................ | 327/113 |
| 6,320,766 B1 * | 11/2001 | Park ......................... | 363/21.09 |
| 6,522,116 B1 * | 2/2003 | Jordan ........................ | 323/288 |
| 7,054,169 B2 | 5/2006 | Huh et al. | |
| 2003/0042879 A1 * | 3/2003 | Huh et al. .................... | 323/282 |
| 2003/0085743 A1 * | 5/2003 | Ullmann et al. ............. | 327/156 |
| 2006/0043949 A1 * | 3/2006 | Li et al. ...................... | 323/282 |
| 2007/0025491 A1 * | 2/2007 | Jeong ......................... | 375/376 |

* cited by examiner

*Primary Examiner*—David C Payne
*Assistant Examiner*—Syed Haider
(74) *Attorney, Agent, or Firm*—Winston Hsu; Scott Margo

(57) ABSTRACT

The present invention discloses a variable-frequency circuit with a compensation mechanism, which comprises: a load sensing/decision unit, a frequency-division unit and a level modulation unit. The present invention applies to a power supply having a frequency-division mode. The power supply has a feedback unit generating a feedback signal. The load sensing/decision unit determines the operational mode according to the feedback signal. The frequency-division unit generates a reference frequency signal. The level modulation unit generates a reference level signal. During frequency variation, the level modulation unit generates a compensation current to modulate the reference level signal. Thereby, the PWM unit of the power supply can adjust the working cycle of the power supply according to the reference frequency signal, the reference level signal and the feedback signal.

11 Claims, 6 Drawing Sheets

VARIABLE-FREQUENCY CIRCUIT WITH A COMPENSATION MECHANISM

FIELD OF THE INVENTION

The present invention relates to a variable-frequency circuit with a compensation mechanism, which applies to a power supply having a frequency-variation mode and detects the timing of frequency variation and compensates the variation of output power.

BACKGROUND OF THE INVENTION

The environmental protection regulation has become stricter and stricter all over the world, and electric appliances also have severe standards for power consumption. Therefore, a power supply usually has an energy-saving circuit to control the output mode when the load varies for reducing the circuit-switching loss to the minimum. Refer to FIG. 1. A conventional power supply comprises: a primary-side rectifier unit 11, a transformer 12, a PWM (Pulse Width Modulation) unit 15, a switch unit 13 and a feedback unit. The feedback unit is coupled to the secondary side and further comprises: a current feedback unit 141 and a voltage feedback unit 142. The primary-side rectifier unit 11 receives an external power and performs a preliminary conversion and then transfers power to the transformer 12. The transformer 12 converts power from the primary side to the secondary side. Then, the power is rectified into a stable DC output. The PWM unit 15 provides a working cycle signal to control the switch unit 13 to determine whether to turn on or turn off the primary side of the transformer 12. The PWM unit 15 can adjust the duty cycle ratio of the working cycle signal according to the feedback signal provided by the current feedback unit 141 and the voltage feedback unit 142. However, the adjustment of duty cycle ratio has its limit. Therefore, the industry developed a variable-frequency energy-saving circuit and a cycle-skipping energy-saving circuit. However, the cycle modification in a variable-frequency or cycle-skipping energy-saving circuit usually causes voltage variation, as shown in FIG. 2. The sudden increase or decrease of frequency results in the upward or downward fluctuation of voltage, which influences the stability of power output. A U.S. Pat. No. 6,212,079 proposed a variable-frequency energy-saving technology—"Method and Apparatus for Improving Efficiency in a Switching Regulator at Light Loads", which can adjust the operational frequency of a switch unit. Therefore, the conventional technology not only can adjust the duty cycle ratio of the working cycle signal of the switch unit but also can adjust the frequency of the working cycle signal. Thereby, the conventional technology can reduce the loss of switching the switch unit. Further, output loss can also be reduced. In a variable-frequency energy-saving circuit, frequency varies with load. Thus, frequency may change anytime and is hard to synchronize with the power-factor regulation circuit or the PWM circuit of the power supply. Non-synchronicity generates beat-frequency noise, or even audible noise of frequency variation. Besides, a variable-frequency energy-saving circuit is hard to integrate with a power-factor regulation circuit or a PWM circuit. A U.S. Pat. No. 7,054,169 proposed a cycle-skipping energy-saving technology—"Switched-Mode Power Supply Supporting Burst-Mode Operation", wherein the cycles of a transformer are divided into a normal mode and a burst mode. Under a common heavy load, the output power sensing unit detects the variation of the load to modulate the pulse width. When the load is decreased to a given value, the conventional technology maintains the original pulse width and skips over the pulses of some cycles to control the circuit to reduce loss via decreasing pulse width or increasing the length of sheltered cycles. The burst-mode technology has an obvious disadvantage—the frequency-shift noise, which is generated by low-frequency interference during sheltered cycles, becomes greater with decreasing frequency; the user can clear hear frequency-shift noise in a light load. Besides, sudden change of load results in sudden decrease of output voltage and a flexuous voltage waveform generated by the over-response circuit (as shown in FIG. 6 and FIG. 8 in the specification of the abovementioned patent). Therefore, the conventional technology has the disadvantages of non-synchronicity and obvious low-frequency/beat-frequency noise. Thus, the abovementioned problems should be overcome to improve the integration with other circuits and decrease users' discomfort.

SUMMARY OF THE INVENTION

The primary objective of the present invention is to provide a variable-frequency circuit with a compensation mechanism, wherein frequency varies with load variation, and a compensation mechanism is used to adjust the working cycle signal output by a PWM (Pulse Width Modulation) unit during frequency variation, and whereby the influence of frequency variation on output voltage is obviously decreased, and the problems of non-synchronicity and over-compensated voltage in the conventional variable-frequency circuit is overcome.

The present invention is a variable-frequency circuit with a compensation mechanism, which applies to a power supply having a frequency-division mode. The power supply has a feedback unit generating a feedback signal and a PWM unit outputting a working cycle signal. The feedback signal enables the PWM unit to change the working cycle signal, and the power output by the secondary side of a transformer is thus adjusted. The PWM unit generates the working cycle signal according to a reference level signal, a reference frequency signal and the feedback signal. When the load increases or decreases, the variable-frequency circuit with a compensation mechanism can vary the working frequency with the load and stabilize output during frequency variation via adjusting the reference level signal and the reference frequency signal. The variable-frequency circuit with a compensation mechanism of the present invention comprises: a load sensing/decision unit, a frequency-division unit and a level modulation unit. The load sensing/decision unit determines whether to output a frequency-variation signal according to the feedback signal to decide whether the variable-frequency circuit operates in a normal mode or a frequency-division mode. The frequency-division unit receives a first clock signal. In the normal mode, the frequency-division unit outputs a reference frequency signal having a frequency identical to the frequency of the first clock signal. In the frequency-division mode, the frequency-division unit divides the frequency of the first clock signal by an integer to obtain a second clock signal and then outputs a reference frequency signal having a frequency identical to the frequency of the second clock signal. The level modulation unit outputs the reference level signal and defines a normal level for the reference level signal. The level modulation unit includes a slope generator and a compensation unit. The slope generator receives the frequency-variation signal and controls the compensation unit to generate a compensation current to modulate the reference level signal and then restore the reference level signal to the normal level within a buffering interval.

Thereby, the transient-state compensation and stabilized output is achieved during frequency variation.

DETAILED DESCRIPTION OF THE PREFERRED EMBODIMENTS

Below, the technical contents of the present invention are to be described in detail in cooperation with the drawings.

Figure 1:
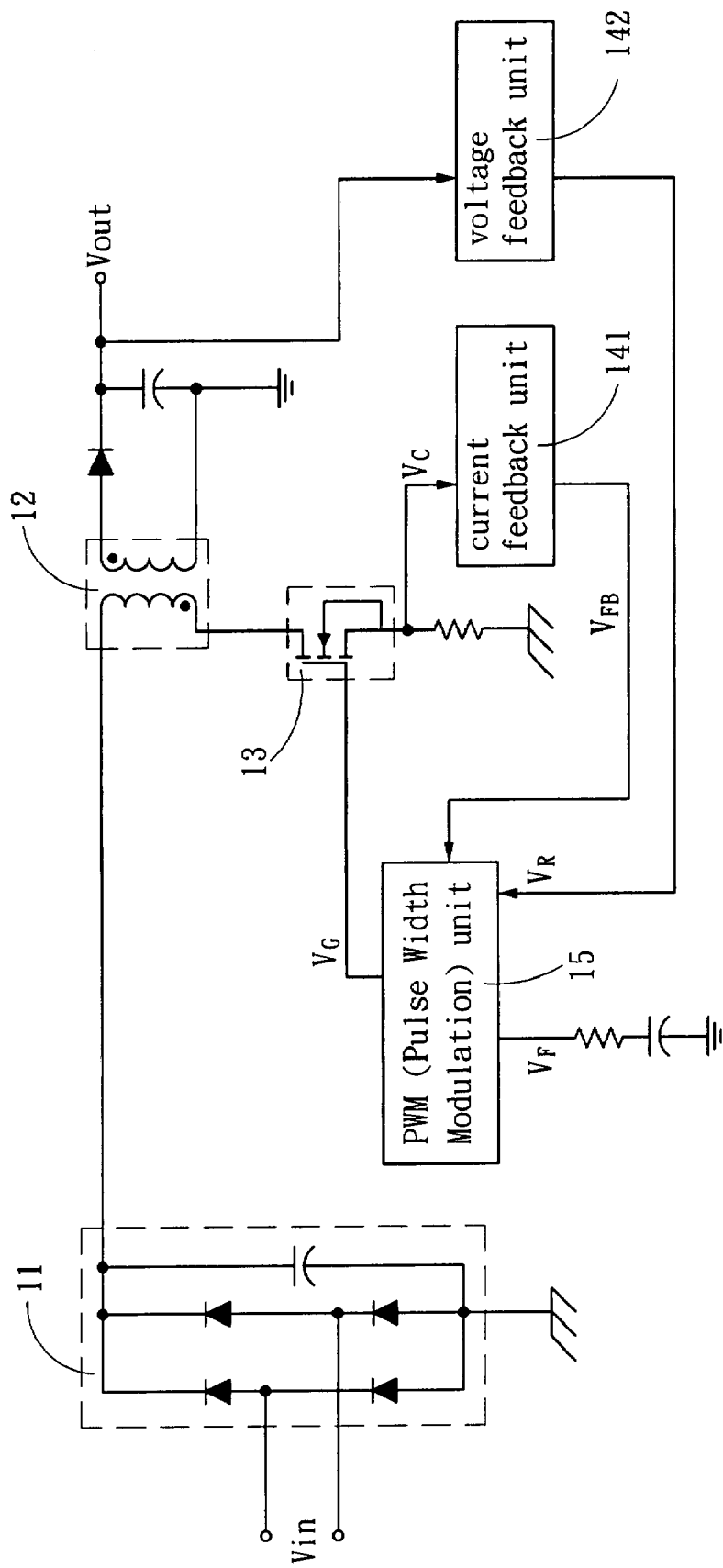
FIG. 1 is a diagram schematically showing the architecture of a conventional power supply circuit.
Figure 2:
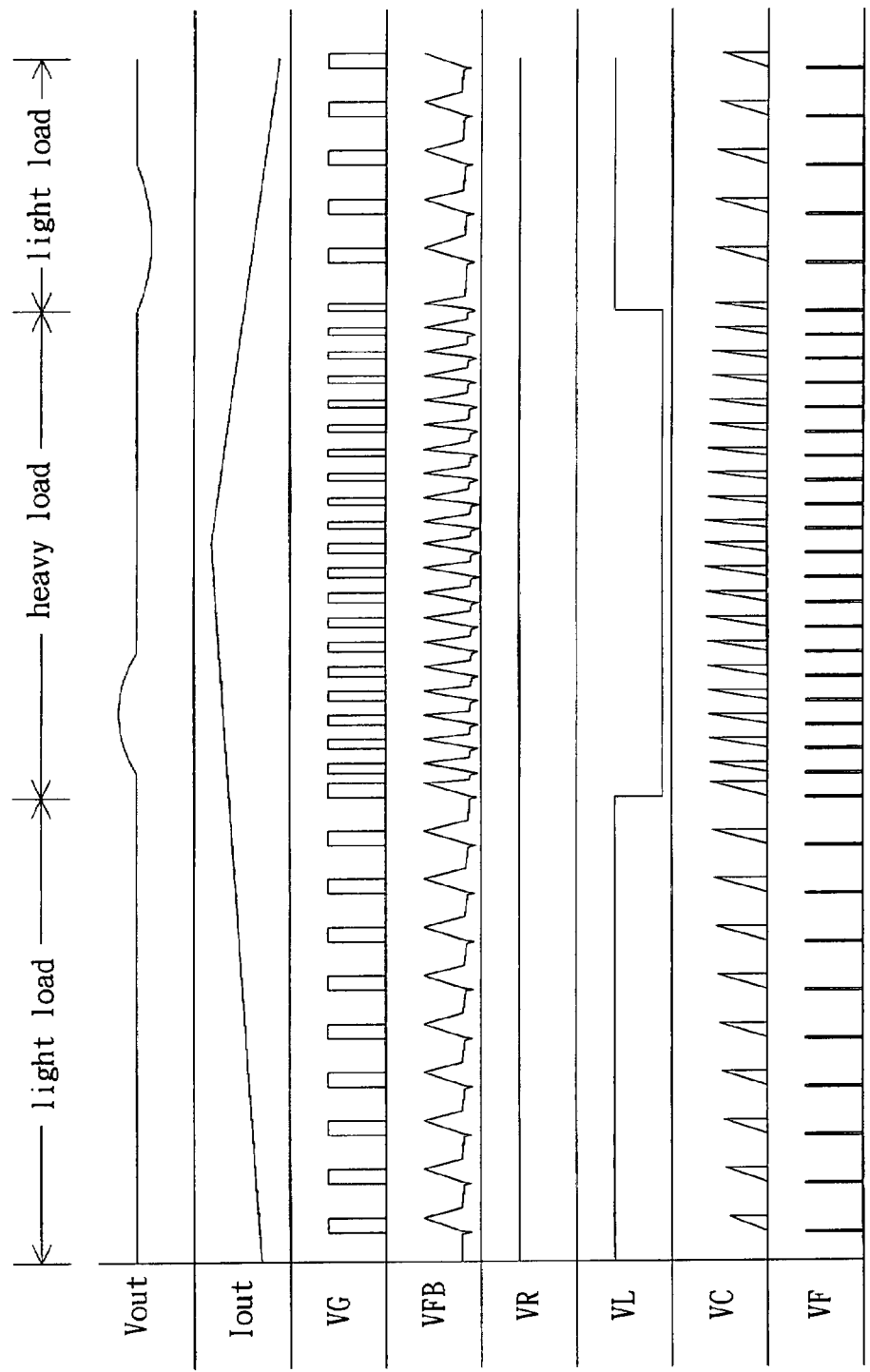
FIG. 2 is a diagram showing the waveforms of a conventional power supply circuit.
Figure 3:
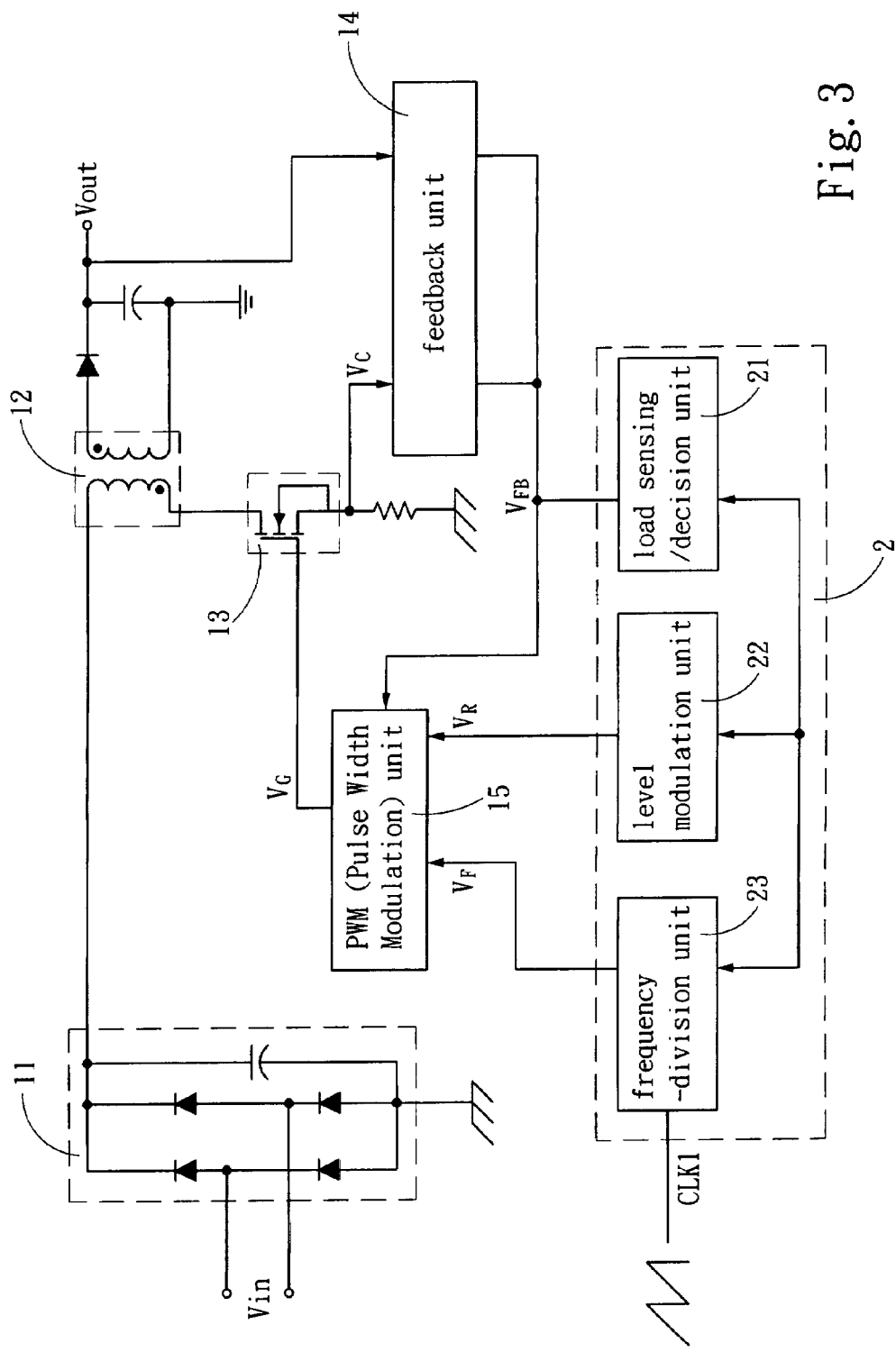
FIG. 3 is a diagram schematically showing the architecture that the present invention is applied to a power supply.

Refer to FIG. 3. The variable-frequency circuit 2 with a compensation mechanism of the present invention is used to adjust a working cycle signal $V_G$ output by a PWM (Pulse Width Modulation) unit 15 of a power supply. The PWM unit 15 generates the working cycle signal $V_G$ according to a reference level signal $V_R$, a reference frequency signal $V_F$ and a feedback reference $V_{FB}$. The power supply comprises: a primary-side rectifier unit 11, a transformer 12, a switch unit 13, a feedback unit 14 and a PWM unit 15. The variable-frequency circuit 2 with a compensation mechanism is coupled to the feedback unit 14 to receive a feedback signal $V_{FB}$ and outputs a reference level signal $V_R$ and a reference frequency signal $V_F$ to the PWM unit 15. The primary-side rectifier unit 11 receives an input power Vin and performs a preliminary conversion and then transfers power to the primary side of the transformer 12. The transformer 12 converts power and outputs power via the secondary side. The power output by the secondary side is controlled by the switch unit 13. The working cycles turning on/off the switch unit 13 are controlled by the working cycle signal $V_G$ output by the PWM unit 15. The feedback unit 14 is coupled to the secondary side of the transformer 12 to generate the feedback signal $V_{FB}$ for adjusting the output of the PWM unit 15. The variable-frequency circuit 2 with a compensation mechanism of the present invention comprises: a load sensing/decision unit 21, a frequency-division unit 23 and a level modulation unit 22. The load sensing/decision unit 21 determines whether the variable-frequency circuit 2 operates in a normal mode or a frequency-division mode according to the feedback signal $V_{FB}$. The frequency-division unit 23 receives a first clock signal CLK1. In the normal mode, the frequency-division unit 23 outputs a reference frequency signal $V_F$ having a frequency identical to the frequency of the first clock signal CLK1. In the frequency-division mode, the frequency-division unit 23 divides the frequency of the first clock signal CLK1 by an integer to obtain a second clock signal CLK2 and then outputs a reference frequency signal $V_F$ having a frequency identical to the frequency of the second clock signal CLK2. The level modulation unit 22 outputs a reference level signal $V_R$ and defines a normal level for the reference level signal $V_R$. During the transition between the normal mode and the frequency-division mode, the level modulation unit 22 generates a compensation current to modulate the reference level signal $V_R$. Correspondingly, the PWM unit 15 modulates the working cycle signal $V_G$ to compensate the variation of output voltage during the transition between the normal mode and the frequency-division mode.

Figure 4:
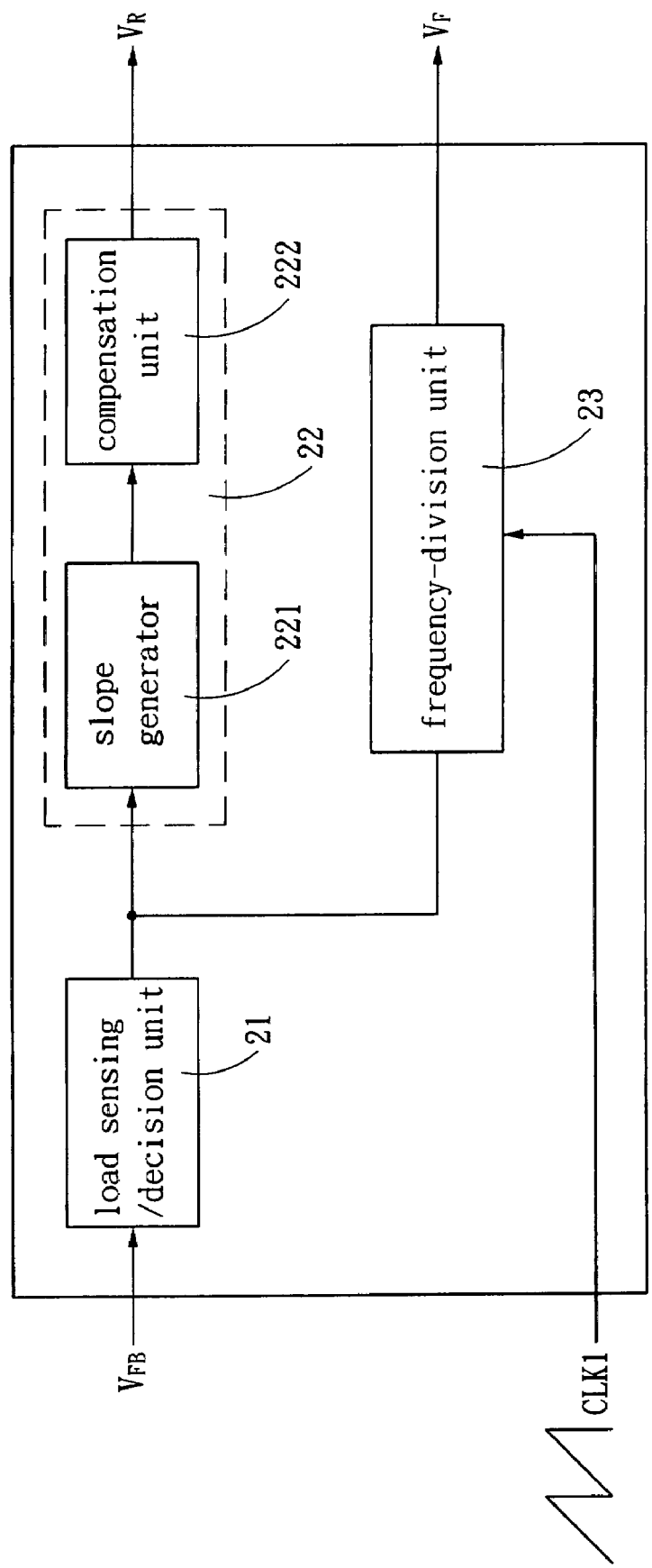
FIG. 4 is a block diagram schematically showing the architecture of the variable-frequency circuit according to the present invention.
Figure 5:
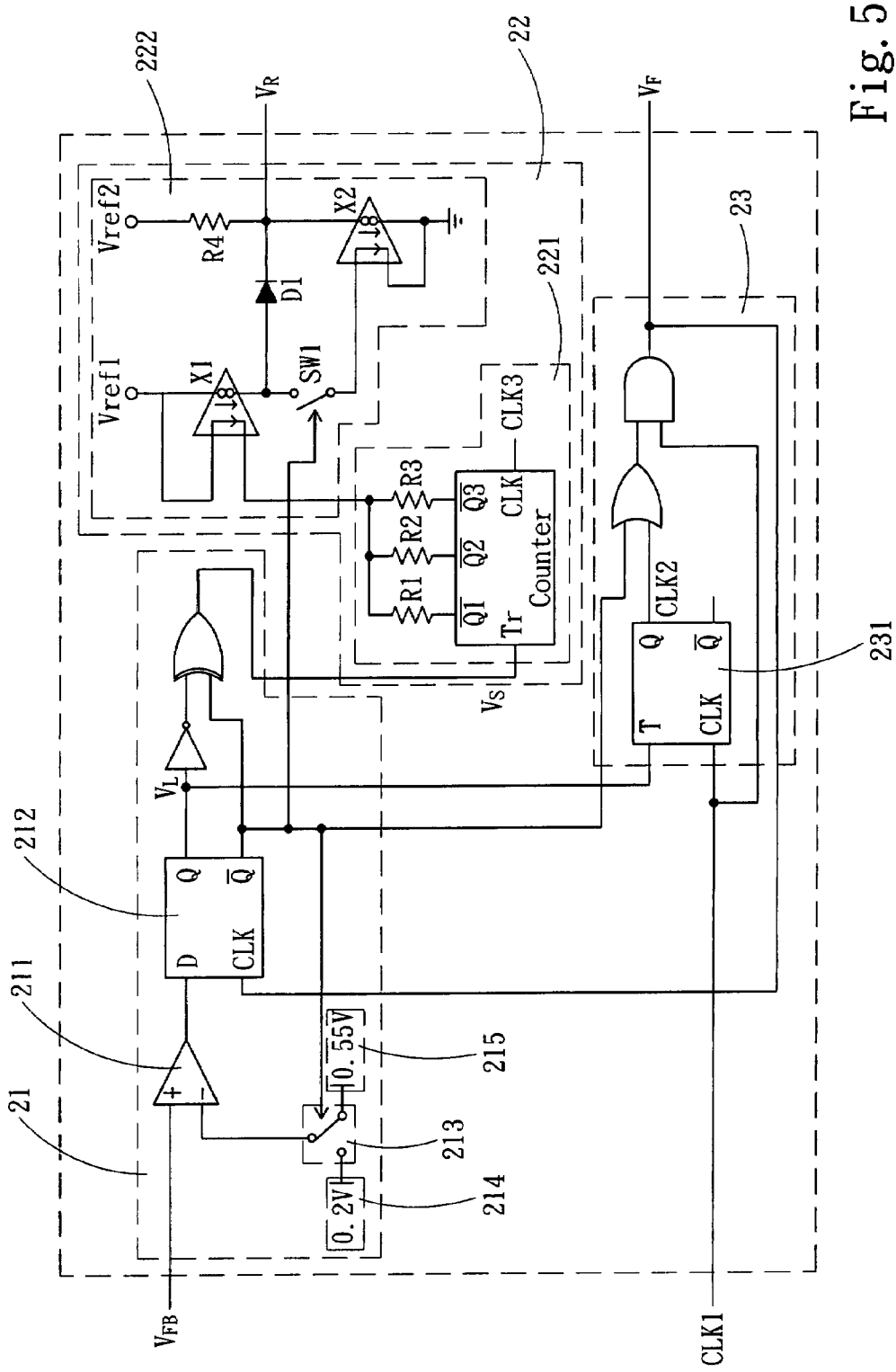
FIG. 5 is a circuit diagram according to one embodiment of the present invention.

Refer to FIG. 4 and FIG. 5 respectively a block diagram and a circuit diagram according to the present invention. The variable-frequency circuit 2 with a compensation mechanism of the present invention comprises: a load sensing/decision unit 21, a level modulation unit 22 and a frequency-division unit 23. The level modulation unit 22 includes a slope generator 221 and a compensation unit 222. During frequency variation, the load sensing/decision unit 21 outputs a frequency-variation signal $V_S$. The slope generator 221 of the level modulation unit 22 is triggered by the frequency-variation signal $V_S$ to control the compensation unit 222 to generate a compensation current to modulate the reference level signal $V_R$ and then restore the reference level signal $V_R$ to the normal level defined by the level modulation unit 22 within a buffering interval. Thereby, the transient-state compensation and stabilized output is achieved during frequency variation.

Refer to FIG. 5 showing a circuit diagram according to a preferred embodiment of the present invention. The load sensing/decision unit 21 includes: a comparator A 221, a D-type flip-flop 212, a switch 213, a first constant voltage source 214, a second constant voltage source 215 and a plurality of logic gates. The comparator A 221 has a positive input terminal, a negative input terminal and an output terminal. The positive input terminal of the comparator A 221 receives the feedback signal $V_{FB}$ and the negative input terminal is coupled to the switch 213, and the output terminal is coupled to a data terminal of the D-type flip-flop 212. The D-type flip-flop 212 further has a clock control terminal (CLK), a positive output terminal (Q) and a negative output terminal. The clock control terminal (CLK) of the D-type flip-flop 212 receives the reference frequency signal $V_F$ and the negative output terminal connects with and controls the switch 213. One terminal of the switch 213 is coupled to the negative input terminal of the comparator A 221; the other terminal is controlled by the negative output terminal of the D-type flip-flop 212 to switch between the first constant voltage source 214 and the second constant voltage source 215. The first constant voltage source 214 defines a first base voltage, and the second constant voltage source 215 defines a second base voltage. The feedback signal $V_{FB}$ is compared with the first base voltage or the second base voltage. When the feedback signal $V_{FB}$ is lower than the first base voltage in the normal mode, the variable-frequency circuit 2 with a compensation mechanism shifts from the normal mode to the frequency-division mode. When the feedback signal $V_{FB}$ is greater than the second base voltage in the frequency-division mode, the compensation variable-frequency circuit 2 with a compensation mechanism shifts from the frequency-division mode to the normal mode. The operation of the D-type flip-flop 212 is a prior art for the persons skilled in the art; therefore, it will not repeat herein. The positive output terminal of the D-type flip-flop 212 outputs a state signal $V_L$, which is further processed by a plurality of logic gates to form a frequency-variation signal $V_S$. The frequency-division unit 23 includes a T-type flip-flop 231 and a plurality of logic gates. The T-type flip-flop 231 has a trigger terminal (T), a clock control terminal (CLK), a positive output terminal (Q), and a negative output terminal. The trigger terminal (T) of the T-type flip-flop 231 is coupled to the positive output terminal of the D-type flip-flop 212 of the load sensing/decision unit 21 to obtain the state signal $V_L$. The clock control terminal (CLK) of the T-type flip-flop 231 receives the first clock signal CLK1. The operation of the T-type flip-flop 231 is also a prior art for the persons skilled in the art; therefore, it will not repeat herein. The plurality of logic gates of the frequency-division unit 23 is coupled to the negative output terminal of the D-type flip-flop 212 of the load sensing/decision unit 21 and the positive output terminal of the T-type flip-flop 231 and receives the first clock signal CLK1 to generates the reference frequency signal $V_F$. The level modulation unit 22 includes a slope generator 221 and a compensation unit 222, and the compensation unit 222 has a first compensation loop and a second compensation loop. The first compensation loop comprises: a first current source X1 and a first bias source Vref1. The second compensation loop comprises: a second current source X2, a second bias source Vref2 and a resistor R4. The first current source X1 and second current source X2 are current-control current sources. The compensation unit 222 further has a switch element SW1 and a diode D1 arranged between the first compensation loop and the second compensation loop. The switch element SW1 is controlled by the negative output terminal of the D-type flip-flop 212. The slope generator 221 may be a digital counter, and each output terminal of the digital counter is coupled to a resistor. The digital counter also has a clock input terminal receiving a third clock signal CLK3. The digital counter counts down from the frequency of the third clock signal CLK3 and outputs pulses from a plurality of output terminals. The pulses output by the digital counter control the operation of the compensation unit 222.

Figure 6:
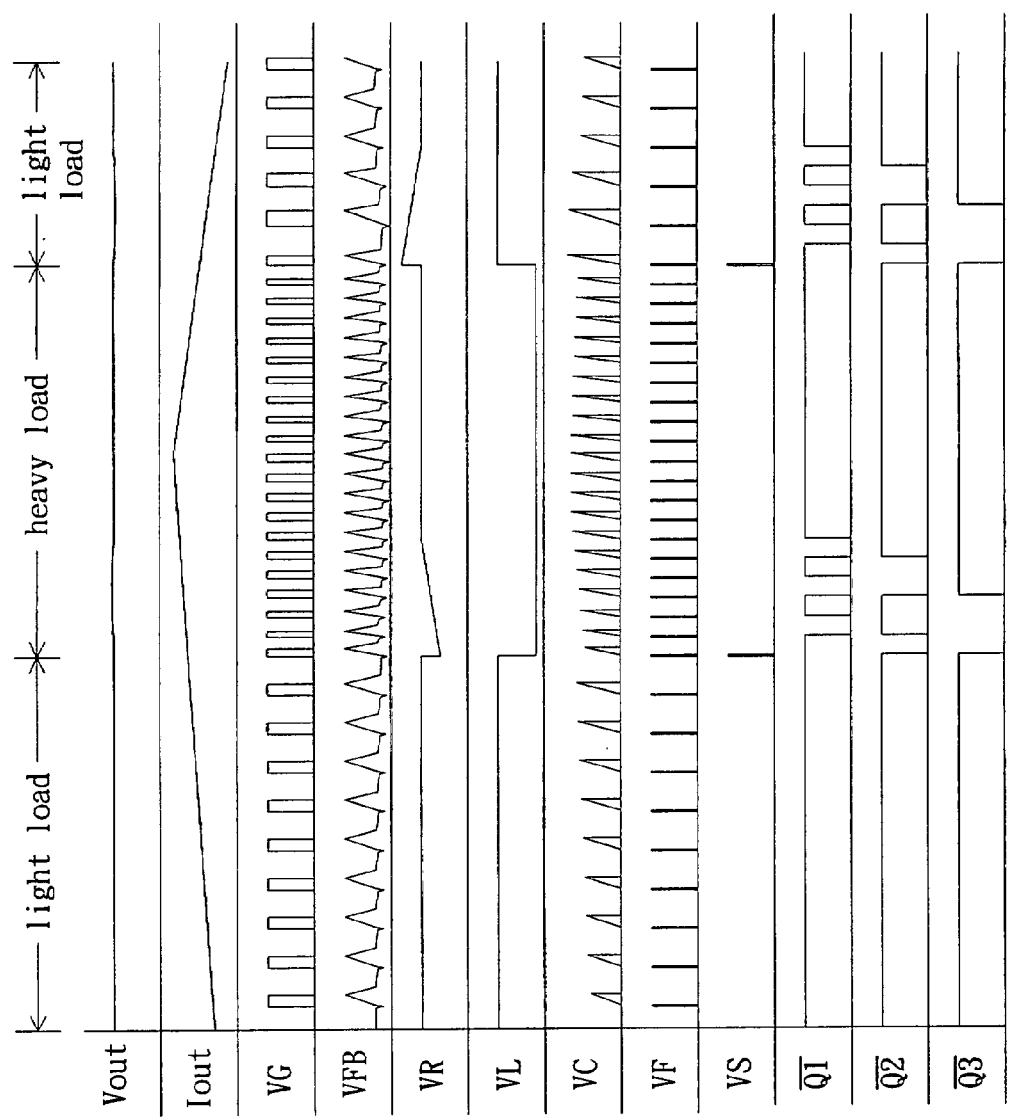
FIG. 6 is a diagram showing the waveforms at the nodes of the circuit shown in FIG. 5.

Refer to FIG. 5 and FIG. 6. When under a light load, the circuit operates in the frequency-division mode to decrease loss. In the frequency-division mode, one terminal of the switch 213 of the load sensing/decision unit 21 is coupled to the first constant voltage source 214 (the voltage thereof is 0.2V in this embodiment). When the feedback signal $V_{FB}$ is greater that the voltage of the first constant voltage source 214, the comparator A 211 outputs a high-level signal, and the state signal $V_L$ output by the D-type flip-flop 212 is also a high-level signal. At this time, the T-type flip-flop 231 of the frequency-division unit 23 generates the second clock signal CLK2, wherein the frequency of the first clock signal CLK1 is divided by 2 to generate the second clock signal CLK2. The plurality of logic gates of the frequency-division unit 23 is coupled to the negative output terminal of the D-type flip-flop 212 of the load sensing/decision unit 21, the second clock signal CLK2 and the first clock signal CLK1. The plurality of logic gates of the frequency-division unit 23 processes the signals and outputs the reference frequency signal $V_F$. The reference frequency signal $V_F$ has a frequency identical to the frequency of the second clock signal CLK2. At this time, the second bias source Vref2 of the compensation unit 222 of the level modulation unit 22 provides a constant voltage as the reference level signal $V_R$. The voltage of the first compensation loop and the second compensation loop is fixed at this time, and the normal level of the reference level signal $V_R$ is thus formed. When the load is increased to such an extent that the feedback signal $V_{FB}$ is reduced to lower than the voltage of the first constant voltage source 214, the comparator A 211 outputs a low-level signal, and the output of the D-type flip-flop 212 is inverted. Because of the inverted output of the negative output terminal of the D-type flip-flop 212, the switch 213 is shifted to the second constant voltage source 215. In the moment of the inversion of the positive and negative output terminals, an inverter behind the positive output terminal delays the signal; then, two out-of-phase signals are input to two input terminals of an XOR gate behind the inverter; thus, the XOR gate outputs an high-level instant pulse functioning as the frequency-variation signal $V_S$. At this time, the T-type flip-flop 231 of the frequency-division unit 23 does not operates, and the plurality of rear logic gates outputs the reference frequency signal $V_F$ having a frequency identical to the frequency of the first clock signal CLK1. In other words, the normal mode is restored. The digital counter of the slope generator 221 of the level modulation unit 22 is triggered by the frequency-variation signal $V_S$. The digital counter has the clock input terminal to receive the third clock signal CLK3. The slope generator 221 counts down from the frequency of the third clock signal CLK3 and outputs a pulse having an inclined and gradually-diminishing waveform. The voltage drop between the first bias source Vref1 and the output terminal of the digital counter creates a current. Thus, the first current source X1 of the first compensation loop outputs a corresponding current. The high-level output of the negative output terminal of the D-type flip-flop 212 turns on the switch element SW1 between the first current source X1 and second current source X2. Thus, the second current source X2 also generates a current as well as the first current source X1. The current generated by the second current source X2 flows through the resistor R4 to the output terminal and functions as a negative compensation current to change the reference level signal $V_R$. When the load is decreased to a light load once again, the feedback signal $V_{FB}$ will rise to higher than the voltage of the second constant voltage source 215 (the voltage of the second constant voltage source 215 is 0.55V in this embodiment). The output of the D-type flip-flop 212 is inverted once again. The switch 213 is shifted to the first constant voltage source 214. The T-type flip-flop 231 and the plurality of logic gates of the frequency-division unit 23 receives the state signal $V_L$ output by the D-type flip-flop 212 and the first clock signal CLK1; then, the T-type flip-flop 231 generates the second clock signal CLK2, and the plurality of logic gates outputs the reference frequency signal $V_F$ having a frequency identical to the frequency of the second clock signal CLK2. At this time, the slope generator 221 of the level modulation unit 22 is triggered by the frequency-variation signal $V_S$ to count down once again and output a pulse. The voltage drop between the first bias source Vref1 and the output terminal of the digital counter creates a current. Thus, the first current source X1 output a current corresponding to the voltage drop between the first bias source Vref1 and the output terminal of the digital counter. The low-level output of the negative output terminal of the D-type flip-flop 212 turns off the switch element SW1, and the current of the first current source X1 flows through the diode D1 to the output terminal and functions as a positive compensation current to change the reference level signal $V_R$.

In the present invention, the slope generator 221 may be a digital counter and counts down from the third clock signal CLK3 and outputs a pulse. Thus, the first compensation loop or the second compensation loop creates a stepwise-increasing or stepwise-decreasing compensation current. The slope generator 221 may further comprise at least one charge/discharge loop of a capacitor, and the voltage variation during the charging/discharging period of the capacitor controls the value of the current output by the first compensation loop. The present invention has a frequency-division function, whereby the power supply can work at different frequencies according to the load. The frequency-division unit 23 may be set to divide the frequency of the first clock signal CLK1 by an integer, such 2, 3 or 4, to generate the second clock signal CLK2; thereby, loss can be reduced. Via the positive or negative compensation current, the reference level signal $V_R$ can have a fixed average slope to restore the normal level during the mode transition. A buffering interval is arranged in from the beginning of the transient state to the restoration of the normal level to minimize the variation of the voltage output by the power supply; thereby, the transient-state compensation and stabilized output is achieved during frequency variation. The present invention utilizes a frequency-division method to reduce the first clock signal CLK1 to a lower-frequency second clock signal CLK2, wherein the frequency of the first clock signal CLK1 is divided by an integer. Thus, the frequency after frequency variation can still synchronize with the original frequency. Therefore, the circuit of the present invention can integrate with another circuit to form an integrated circuit.

The preferred embodiments described above are only to demonstrate the present invention but not to limit the scope of the present invention. Any equivalent modification or variation according to the spirit of the present invention is to be also included within the scope of the present invention based on the claims stated below.

From the above description, it should be seen that the present invention has greatly improved the conventional technology and meets the patent conditions of novelty and non-obviousness required by the law. Thus, the Inventor files the application for a patent. It is greatly appreciated if the application can be fast approved.

What is claimed is:

1. A variable-frequency circuit with a compensation mechanism, applying to a power supply having a frequency-division mode, wherein said power supply has a feedback unit generating a feedback signal and a PWM (Pulse Width Modulation) unit outputting a working cycle signal; said feedback signal enables said PWM unit to change said working cycle signal, and the power output by the secondary side of a transformer is thus adjusted; said PWM unit generates said working cycle signals according to a reference level signal, a reference frequency signal and said feedback signal, and wherein said variable-frequency circuit with a compensation mechanism comprises:
   a load sensing/decision unit determining whether to output a frequency-variation signal according to said feedback signal to decide whether said variable-frequency circuit operates in a normal mode or a frequency-division mode;
   a frequency-division unit receiving a first clock signal, wherein in said normal mode, said frequency-division unit outputs a reference frequency signal having a frequency identical to the frequency of said first clock signal; in said frequency-division mode, said frequency-division unit divides the frequency of said first clock signal by an integer to obtain a second clock signal and then outputs a reference frequency signal having a frequency identical to the frequency of said second clock signal; and
   a level modulation unit outputting said reference level signal, defining a normal level for said reference level signal and including a slope generator and a compensation unit, wherein said slope generator receives said frequency-variation signal and controls said compensation unit to generate a compensation current to modulate said reference level signal and then restore said reference level signal to said normal level within a buffering interval; thus, transient-state compensation and stabilized output is achieved during frequency variation.

2. The variable-frequency circuit with a compensation mechanism according to claim 1, wherein said compensation unit of said level modulation unit generates a negative compensation current when said frequency-division mode is shifted to said normal mode, and said compensation unit generates a positive compensation current when said normal mode is shifted to said frequency-division mode.

3. The variable-frequency circuit with a compensation mechanism according to claim 2, wherein said level modulation unit includes a slope generator and a compensation unit, and said compensation unit has a first compensation loop and a second compensation loop; in said normal mode, said slope generator receives said frequency-variation signal and controls said first compensation loop to generate a positive compensation current; in said frequency-division mode, said slope generator receives said frequency-variation signal and controls said second compensation loop to generate a negative compensation current; via said positive compensation current or said negative compensation current, said reference level signal can have a fixed average slope to restore said normal level during mode transition; said buffering interval is arranged in from the beginning of the transient state to the restoration of said normal level.

4. The variable-frequency circuit with a compensation mechanism according to claim 3, wherein first compensation loop further comprises: a first current source and a first bias source; said second compensation loop further comprises: a second current source, a second bias source and a resistor; said compensation unit further has a switch element and a diode arranged between said first compensation loop and said second compensation loop; in said normal state, said switch element is turned on to enable said second current source to work.

5. The variable-frequency circuit with a compensation mechanism according to claim 3, wherein said slope generator is a digital counter having a plurality of output terminals, and each said output terminal is coupled to a resistor; said digital counter also has a clock input terminal receiving a third clock signal; said digital counter counts down from the frequency of said third clock signal and outputs a pulse; thereby, said first compensation loop or said second compensation loop forms a stepwise-increasing or stepwise-decreasing compensation current.

6. The variable-frequency circuit with a compensation mechanism according to claim 3, wherein said slope generator further comprise at least one charge/discharge loop of a capacitor, and the voltage variation during the charging/discharging period of said capacitor controls the output value of said first compensation loop.

7. The variable-frequency circuit with a compensation mechanism according to claim 1, wherein said load sensing/decision unit has a first base voltage and a second base voltage; said feedback signal is compared with said first base voltage or said second base voltage to determine whether said variable-frequency circuit with a compensation mechanism operates in said normal mode or said frequency-division mode.

8. The variable-frequency circuit with a compensation mechanism according to claim 7, wherein when said variable-frequency circuit with a compensation mechanism operates in said normal mode, and when said feedback signal is lower than said first base voltage, said variable-frequency circuit with a compensation mechanism shifts from said normal mode to said frequency-division mode; when said variable-frequency circuit with a compensation mechanism operates in frequency-division mode, and when said feedback signal is greater than said second base voltage, said variable-frequency circuit with a compensation mechanism shifts from said frequency-division mode to said normal mode.

9. The variable-frequency circuit with a compensation mechanism according to claim 8, wherein said load sensing/decision unit includes: a comparator A, a D-type flip-flop, a switch, a first constant voltage source, a second constant voltage source and a plurality of logic gates; said comparator A has a positive input terminal, a negative input terminal and an output terminal; said positive input terminal of said comparator A receives said feedback signal, and said negative input terminal of said comparator A is coupled to said switch, and said output terminal of said comparator A is coupled to a data terminal of said D-type flip-flop; said D-type flip-flop further has a clock control terminal, a positive output terminal and a negative output terminal; said clock control terminal of said D-type flip-flop receives said reference frequency signal, and said negative output terminal of said D-type flip-flop connects with and controls said switch; one terminal of said switch is coupled to said negative input terminal of said comparator A; the other terminal of said switch is controlled by said negative output terminal of the D-type flip-flop to switch between said first constant voltage source and said second constant voltage source; said plurality of logic gates processes signals from said positive output terminal and said negative output terminal of said D-type flip-flop and outputs said frequency-variation signal.

10. The variable-frequency circuit with a compensation mechanism according to claim 9, wherein said frequency-division unit includes a T-type flip-flop and a plurality of logic gates; said T-type flip-flop has a trigger terminal, a clock control terminal, a positive output terminal, and a negative output terminal; said trigger terminal is coupled to said positive output terminal of said D-type flip-flop of said load sensing/decision unit; said clock control terminal receives said first clock signal; said plurality of logic gates is coupled to said negative output terminal of said D-type flip-flop, said positive output terminal of said T-type flip-flop and receives said first clock signal to generate said reference frequency signal.

11. The variable-frequency circuit with a compensation mechanism according to claim 1, wherein the frequency of said second clock signal is obtained via dividing the frequency of said first clock signal by an integer.

* * * * *